United States Patent
Fazel et al.

(10) Patent No.: US 7,346,138 B2
(45) Date of Patent: Mar. 18, 2008

(54) METHOD OF OPERATING A MESSAGE RECEIVER

(75) Inventors: Khaled Fazel, Auenwald (DE); Volker Hespelt, Backnang (DE); Volker Engels, Backnang (DE); Bernd Freidrichs, Backnang (DE)

(73) Assignee: Marconi Communications GmbH, Backnang (DE)

( * ) Notice: Subject to any disclaimer, the term of this patent is extended or adjusted under 35 U.S.C. 154(b) by 670 days.

(21) Appl. No.: 10/344,773

(22) PCT Filed: Aug. 13, 2001

(86) PCT No.: PCT/IB01/01760

§ 371 (c)(1),
(2), (4) Date: Sep. 5, 2003

(87) PCT Pub. No.: WO02/15065

PCT Pub. Date: Feb. 21, 2002

(65) Prior Publication Data

US 2004/0170239 A1 Sep. 2, 2004

(30) Foreign Application Priority Data

Aug. 17, 2000 (DE) ................ 100 40 222

(51) Int. Cl.
*H04L 7/00* (2006.01)

(52) U.S. Cl. ..................................... 375/354

(58) Field of Classification Search ........... 375/139, 375/142, 143, 145, 150, 152, 343, 354, 356, 375/359, 362, 364, 365, 366, 367, 368, 371, 375/373; 370/286, 289, 304, 324, 503, 506, 370/507, 508, 509, 510, 511, 512, 513, 514, 370/515, 516; 455/265, 570; 379/3; 713/375, 713/400; 714/12, 707, 731, 744, 775, 789, 714/798

See application file for complete search history.

(56) References Cited

U.S. PATENT DOCUMENTS 4,599,732 A 7/1986 LeFever
5,625,573 A 4/1997 Kim (Continued)

FOREIGN PATENT DOCUMENTS

DE  35 90 158 T1  6/1986

(Continued)

OTHER PUBLICATIONS

Mutagi, Pseudo noise sequences for engineers, Electronics & Communication Engineering Journal, Apr. 1996, p. 87.*

(Continued)

*Primary Examiner*—Sam K. Ahn
(74) *Attorney, Agent, or Firm*—Kirschstein et al.

(57) ABSTRACT

A method of operating a message receiver for a message, that is present as a burst, which includes at least a training sequence and useful data is performed by stepwise synchronizing the receiver with the burst as the burst is received.

22 Claims, 7 Drawing Sheets

U.S. PATENT DOCUMENTS

| | | | | |
|---|---|---|---|---|
| 5,923,761 | A | * | 7/1999 | Lodenius ..................... 455/73 |
| 5,953,323 | A | * | 9/1999 | Haartsen ..................... 370/330 |
| 5,991,283 | A | * | 11/1999 | Saunders ..................... 370/333 |
| 6,320,919 | B1 | * | 11/2001 | Khayrallah et al. ......... 375/347 |
| 6,327,469 | B1 | * | 12/2001 | Gaastra ....................... 455/436 |
| 6,442,392 | B2 | * | 8/2002 | Ruutu et al. ............. 455/456.1 |
| 6,567,374 | B1 | * | 5/2003 | Bohnke et al. ............. 370/203 |
| 6,885,693 | B1 | * | 4/2005 | Burton ........................ 375/142 |
| 7,027,535 | B1 | * | 4/2006 | Aftelak ....................... 375/344 |
| 7,145,955 | B1 | * | 12/2006 | Bohnke et al. ............. 375/260 |

FOREIGN PATENT DOCUMENTS

| | | |
|---|---|---|
| DE | 195 11 403 A1 | 10/1996 |
| DE | 299 05 942 U1 | 10/1999 |

OTHER PUBLICATIONS

Ranta, P. A., et al., *Co-Channel Interference Cancelling Receiver for TDMA Mobile Systems*, Communications—Gateway to Globalization Proceedings of the International Conference on Communications, (ICC), New York, IEEE, U.S., Jun. 18, 1995, pp. 17-21.

Ungerboeck, G., *Adaptive Maximum-Likelihood Receiver for Carrier-Modulated Data-Transmission Systems*, IEEE Transactions on Communications, IEEE Inc., New York, U.S., May 5, 1974, pp. 624-636.

Neuner H.K., et al., *Synchronisation Einer Mobilstation IM GMS-System DMCS 900 (D-Netz )Synchronisation of Mobile Station in GMS TDMA Mobile Radio Communication System DMCS 900 (D-Netz )*, Frequenz, Schiele Und Schon GMBH, Berlin, DE, Mar. 3/4, 1993, pp. 66-72.

* cited by examiner

METHOD OF OPERATING A MESSAGE RECEIVER

CROSS REFERENCE TO RELATED APPLICATIONS

This application is a national phase application of International Application No.: PCT/IB01/01760, filed Aug. 13, 2001.

The invention relates to a method for the operation of a message receiver for a message, that is present as a burst, that includes at least a training sequence and useful data.

State of the Art

Such methods are known in the most diverse forms of embodiment. In a network with point-to-multi-point-access, which can be in the form of a cellular network, bursts are used for message or data communication. These bursts are transmitted in fixed, sequential time slots according to the TDMA (time division multiple access) method known in the art. With such TDMA signals a burst includes at least a training sequence and useful or signalling data, whereby the training sequence can come before the useful data. This training sequence is therefore also called preamble. However other TDMA methods are also known, in the case of which the training sequence is transmitted in the middle of two useful data blocks as midamble. The training sequence can of course also be appended at the end of the useful data block.

The training sequence serves on the message receiver to enable the latter to be synchronized with the burst so that data transmission is possible from a base station to a terminal station and vice versa over an air interface. To synchronize the message receiver this must be synchronized at least with the carrier frequency and phase position of the carrier frequency of the burst. In addition it must be ensured that the receiver is synchronized with the fixed pre-set time slot, in which the burst has been transmitted, so that it is possible to demodulate and decode the data sent.

In principle two types of synchronization are known, whereby in the case of one type of synchronization the useful data stream is, in particular statistically, evaluated. This type is also known as data supported synchronization. With another type synchronization takes place on the basis of pilot signals, which are transmitted as a training sequence.

In the case of data supported synchronization the parameters for synchronization are determined on the basis of statistical evaluations of the transmitted or received signal. For this purpose various methods are known, for example the "maximum likelihood sequence estimation" (MLSE). With another algorithm a closed control loop is used, in order to be able to exactly calculate the synchronization parameters. This statistical evaluation however consumes a great amount of time, so that with a high useful data rate to be transmitted this known method can only be used with very great cost or complexity.

In particular for multi media systems, in the case of which images or video and audio sequences are transmitted in this way, the possibility of synchronizing the message receiver is not so easy with the MLSE method, since it is virtually impossible to demodulate or decode the useful data in real time.

Another type of data supported synchronization is based on a method of Viterbi & Viterbi, in the case of which the receiver is synchronized on the basis of MPSK-modulated symbols by means of non-linear transformation of the incoming message consisting of complex symbols with mean value calculation and phase position determination. The algorithm used according to this Viterbi & Viterbi method requires a pre-set interval of data, so that the mean value can be calculated. A disadvantage with this method is that the phase position can only be determined if there is a slight frequency offset between transmitter and receiver. In particular in the case of data transmission over air interfaces however this is very seldom guaranteed, since multipath propagation of the transmitted signals occurs and furthermore there is no frequency coupling between message receiver and transmitter.

With pilot signal supported synchronization very long training sequences are communicated with the useful data, so that the synchronization algorithms can accurately determine the synchronization parameters. However as a result bandwidth for useful data communication is lost, since bandwidth is lost accordingly through the very long training sequences.

In GSM mobile radio communications useful data and signalling and control information are also transmitted in accordance with the known TDMA method. Due to the fact that essentially only speech is transmitted, a low data rate is the case for the useful data. The physical channel (time slot on a pre-set frequency) is divided into several logic channels for transmission of the control and signalling information. That is to say in the case of a divided time slot signalling and control information is transmitted once and with the next time slot useful data is transmitted in the same slot position. A training sequence is transmitted along with both the useful data and the signalling and control information, which in GSM mobile radio communications lies in the middle between two useful data packets, and is therefore known as midamble. Because the physical channel, that is to say the time slot on a frequency, is divided into a plurality of logic channels, in which all the necessary data is transmitted, the transmission rate for the useful data is however too low for multimedia applications.

In the case of pilot signal supported synchronization methods it is also known to use special training sequences in order to determine the carrier frequency and sampling rate or clock frequency in the case of burst transmissions. This method is based on a combination of filtration and linear feedback of the received symbols within a time slot. This technology is very similar to the previously mentioned pilot signal technology, in which all calculations are carried out in the time domain. In the case of the known method now being described periodic training sequences are transmitted, in which therefore unequal symbols alternate at pre-set intervals. The received signal of this frequency corresponds to a signal which is cosine in form. The Fourier transform of the received frequency provides two pilot signals. After the received signal has been filtered and linear feedback carried out the symbol time (clock) and frequency offset can be deduced. This method has the disadvantage that the transmission channel impulse response and time slot synchronization cannot be carried out.

A type of synchronization is also known, in which for example two pseudo noise sequences are transmitted as midamble within a time slot. According to these evaluation algorithms synchronization is possible both for the carrier frequency and for the phase position, however for time synchronization considerable complexity is needed.

Advantages of the Invention

With the method, which has the features stated in claim 1, it is possible in an advantageous way as a burst, which includes including useful data and at least a training sequence, is received to synchronize the receiver very rapidly with the burst. The receiver is pre-synchronized according to the invention, so that further synchronization parameters can be determined more rapidly, since the symbols can be more easily evaluated by the pre-synchronized receiver. The total synchronization time is therefore reduced in an advantageous way. Therefore it is possible to use the message receiver in a multimedia transmission system in which a high data rate for the useful data has to be transmitted, so that images or video and/or audio sequences can be shown efficiently. The method according to the invention can of course also be used in other transmission systems with high data transmission rates.

In a preferential form of embodiment, during its stepwise synchronization in a first synchronizing stage, the receiver is synchronized with the clock of the message and the phase position of the carrier frequency of the burst. This embodiment is preferred, if the frequency offset is slight or negligible.

In another form of embodiment the receiver is synchronized during the first synchronizing stage with the clock of the message and the carrier frequency of the burst. This variant is preferred if the phase offset turns out to be slight.

In one form of embodiment the receiver is preferably synchronized during a second synchronizing stage with the time slot of the burst. The receiver is therefore in this case synchronized with the physical channel.

In a refinement of the invention it is proposed that the transmission channel impulse response and/or automatic gain control (AGC) is calculated during the second synchronizing stage. On the basis of these synchronization parameters the air interface, that is to say the radio transmission path, can be monitored so that the channels can be aligned.

According to a further refinement of the invention it is proposed that the receiver is synchronized during the second synchronizing stage with the carrier frequency of the burst. In particular this variant is used if the clock and phase position have been determined during the first synchronizing stage. The receiver can thus be fine-tuned to the carrier frequency during the second synchronizing stage.

If the clock and carrier frequency have been determined in the first synchronizing stage and if the receiver has been pre-synchronized accordingly, the receiver is synchronized with the phase position of the carrier frequency during the second synchronizing stage. In particular post synchronization of the phase position or carrier frequency is proposed, if the useful data has to be evaluated.

According to a further refinement of the invention it is proposed that the receiver is synchronized with the phase and/or frequency of the carrier frequency after the first synchronizing stage and/or during or after the second synchronizing stage. This synchronization sequence—also known as tracking—is proposed in particular if the phase position and/or frequency of the carrier signal vary during a burst. Tracking is thus carried out in a preferred embodiment while the useful data is being decoded.

In a preferred form of embodiment a Viterbi decoder is used for tracking and decoding the useful data. Alternatively or additionally tracking can also take place according to the Viterbi & Viterbi algorithms known in the art. The Viterbi decoder or the Viterbi & Viterbi algorithms are characterized in particular in that preliminary decisions can be taken with them, which finally make tracking possible.

In a particularly preferred embodiment it is proposed that the training sequence comprises at least two partial sequences. The partial sequences are configured in such a way that allows gradual synchronization of the receiver. Thus for example it can be proposed that one of the partial sequences is in itself periodic, as a result of which the phase position and/or carrier frequency and/or symbol clock can be determined particularly simply and rapidly. In a preferred embodiment one of the partial sequences is therefore evaluated during the first synchronizing stage, which is periodic in itself.

Furthermore in a preferred embodiment it is proposed that at least one of the partial sequences comprises a symbol sequence, which allows the time slot of the burst to be aligned and the channel impulse response, the phase position, the automatic gain control (AGC) as well as transmitting power to be calculated. For this purpose either partial sequences which include pilot signals can be proposed, or partial sequences which comprise pseudo noise sequences (PN sequences). Obviously combinations are also possible, so that one partial sequence comprises pilot signals and the other partial sequence comprises the pseudo noise sequences. Naturally both partial sequences can comprise pilot signals or pseudo noise sequences.

In yet another embodiment it is proposed that for the second synchronizing stage the useful data is statistically evaluated. It would then be sufficient for example only to transmit a partial sequence with pilot signals so that the first synchronizing stage can be carried out. The remaining synchronization parameters can then be determined by statistical evaluation from the useful data received and the second synchronizing stage can be carried out.

A form of embodiment is preferred in which, irrespective of the number of partial sequences, the training sequence comprises a constant duration or number of symbols. Thus the receiver can be easily synchronized on the basis of the training sequence codes or symbol sequences known to it.

In a particularly preferred embodiment an incoming burst is detected by means of a power detector at the receiver input. Power detection thus serves as a quasi trigger (start) signal for starting the gradual synchronization of the receiver.

According to a further refinement of the invention it is proposed that the time slot structure is determined with the incoming burst, that is to say the number of symbols in the useful data is evaluated. Thus it can be easily determined whether useful data is actually transmitted, or whether control or signalling information is transmitted, which usually comprises a lower number of symbols within the packet.

A preferred embodiment is one in which the channel impulse response is calculated by cross correlation of the burst and the second partial sequence. In particular it is therefore proposed in this case that correlation takes place between the useful data and the second partial sequence, from which the channel impulse response can be determined.

In a further refinement of the invention it is proposed that during cross correlation the training sequence is shifted by a pre-definable number of symbols, in order to determine the corresponding number of multipath propagation echoes, from which the phase position and amplitude of each multipath propagation can then be determined in a preferred embodiment.

The AGC parameters can be determined in a particularly simple way from the phase position and amplitude of the particular multipath propagation echoes.

In addition it can be proposed that the constant phase position which is also called the static phase position is determined for each multipath propagation.

In another embodiment of the invention it is proposed that the periodic partial sequence is evaluated in the time domain. Thus the pilot signals can be determined, from which the frequency and/or phase position can be obtained.

The other partial sequence, which is used in particular for the second synchronizing stage, is evaluated in a preferred embodiment within the complex number range, so that the phase position and frequency can be deduced directly from the complex number pair having real and imaginary parts.

In a particularly preferred embodiment the burst comprises the training sequence as preamble. Obviously it is however also possible to transmit the training sequence as midamble. If at least two partial sequences are transmitted with the burst as a training sequence, the two partial sequences can also be attached and/or inserted at different places within the useful data.

DRAWING

The invention is described in more detail below on the basis of exemplary embodiments with reference to the drawing, wherein.

DESCRIPTION OF THE EXEMPLARY EMBODIMENTS

Figure 1:
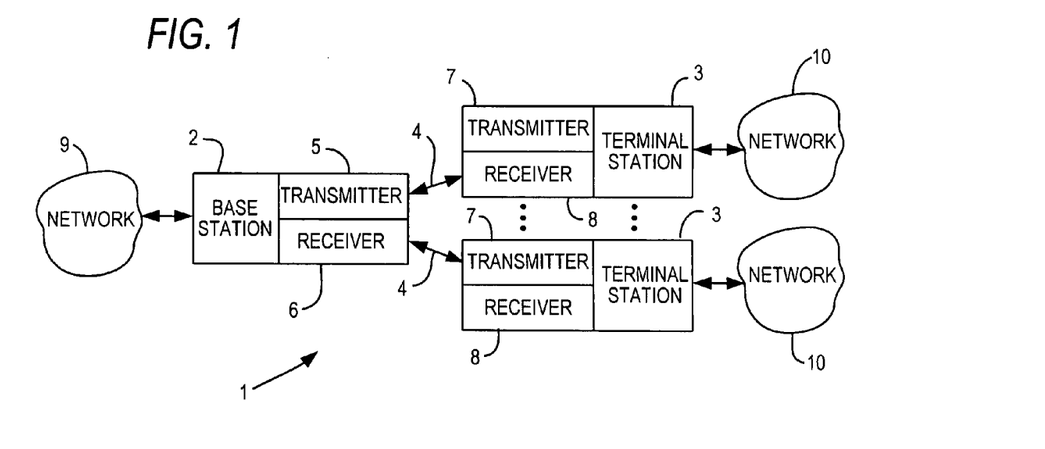
FIG. 1 shows a data communication network with a base station and several terminal stations.

FIG. 1 shows by way of an extract a data communication network 1, which comprises at least one base station 2 as a network element and one or more terminal stations 3, which can exchange data with the base station 2 over an air interface 4. Data communication is also possible over the interface 4 from the base station 2 to the terminal stations 3. Thus the base station has at least one transmitter 5 and one receiver 6. Accordingly the terminal stations 3 are equipped with at least one transmitter 7 and one receiver 8 in each case.

The base station 2 can be coupled to a network 9, which for example is a public communications network. The transmission circuits in this network 9 can be hard-wired or realized as air interfaces. The terminal stations 3 can be connected to a network 10, whereby each of the networks 10 is preferably a local network, to which a plurality of end-user devices (not shown) can be linked. The terminal stations 3 are arranged in fixed locations in a preferred embodiment. It would however also be conceivable if the terminal stations 3 were configured as mobile stations. The base station 2 is preferably likewise in a fixed location. The data communication network 1 in a preferred embodiment is configured as a cellular network, in which the terminal stations 3 can be arranged at various distances from the base station 2. The data communication network 1 is in particular preferably used for transmitting multimedia services, in which a correspondingly high data transmission rate has to be achieved, in order to be able to provide multimedia services in real time. For the transmission of data over this data communication network 1 a burst mode is proposed, in which signal bundles known as "burst" are transmitted over the air interfaces 4. These bursts are preferably transmitted using TDMA technology, in which a plurality of time slots are provided on a transmission or carrier frequency, whereby preferably it is proposed that one of the terminal stations 3 has access to at least one time slot.

In this so-called point-to-multi-point data communication network 1 with division of individual network sectors into cells, the base station 2 for transmission preferably possesses one or more directional antennas, which are or can be directed toward the terminal stations 3. Several frequency channels for both transmission directions are feasible. The individual frequency channels preferably lie in a frequency band of 3.5 to 28 GHz. Obviously other frequency ranges can be selected.

For data communication from the terminal stations 3 to the base station 2 data is transmitted as bursts according to the TDMA method. Each of the terminal stations 3 for this purpose has at least one time slot assigned to it, in which a TDMA burst is transmitted, which is identified in FIG. 2a with the reference symbol 11. A TDMA burst 11 of this kind includes at least a useful data packet 12, at least a training sequence 13 and a protection time 14, during which nothing is transmitted, in order to prevent adjacent time slots being affected. The burst 11 in this case comprises the following preferred structure: the training sequence 13 is transmitted as preamble 13', that is to say it is sent before the useful data packet 12, whereby the useful data packet 12 comes before the protection time 14. It would however also be conceivable according to another embodiment if the training sequence 13 came between two partial useful data packets, i.e. transmitted as midamble. Moreover it would be conceivable if the training sequence 13 was appended to the useful data packet 12, and transmitted between the useful data packet 12 and the protection time 14.

Figures 2A, 2B:
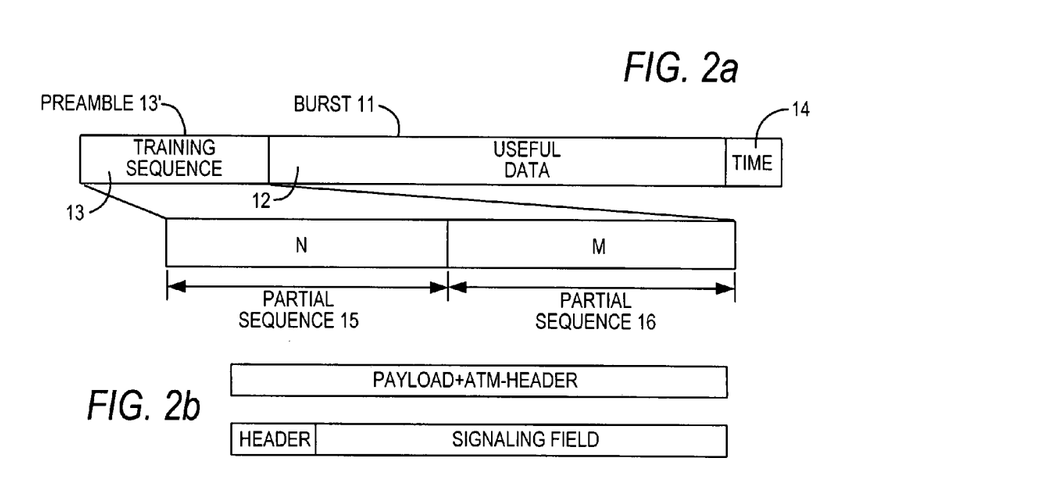
FIG. 2a shows the structure of a burst.
FIG. 2b shows different packet structures of a message for the transmission from the base station to the terminal stations.

In order to allow a high data transmission rate from the terminal stations 3 to the base station 2, it is of utmost importance that the receiver 6 in the base station 2 can be synchronized very rapidly with the burst transmitted by the terminal stations 3, so that rapid demodulation and decoding of the burst 11 are ensured, since the data transfer rate depends on it in the end. In order to achieve this, in the embodiment according to the invention the receiver 6 of the base station 2 is stepwise synchronized with the received burst 11. For this purpose it is proposed that the training sequence 13 is divided into two partial sequences 15 and 16, whereby the symbols contained in the two partial sequences 15 and 16 or the information reflected by the symbols is coded or modulated, in such a way that each partial sequence 15 and 16 can be decoded and evaluated individually, so that the information contained in the partial sequences 15 and 16 can be used for stepwise synchronization of the receiver 6. The partial sequence 15 comprises a number N of symbols; the partial sequence 16 a number M of symbols, whereby N and M can be the same or different.

In a preferred embodiment the first partial sequence 15 contains pilot signals, with which the first synchronizing stage of the receiver 6 can be carried out, in such a way that synchronization firstly takes place with the symbol clock of the burst 11 and the phase. position of the carrier frequency of the burst. However synchronization can also firstly be on the symbol clock of the message and the carrier frequency of the burst. Because this first synchronizing stage is carried out on the receiver 6 of the base station 2, the second partial sequence 16 can be evaluated more rapidly and reliably for the second synchronizing stage., since through pre-synchronization synchronization or the first synchronizing stage a more rapid and reliable decoding of the information contained in the second partial sequence is possible. As mentioned previously, pilot signals are preferably transmitted in the first partial sequence. Symbol sequences are preferably contained in the second partial sequence 16 which enable alignment of the time slot of the burst and calculation of the channel impulse response. For this purpose preferably symbol sequences are transmitted, which include at least two sequences of a pseudo noise. During the second synchronizing stage apart from the channel impulse response (CIR), automatic gain control (AGC) at the receiver 6 can also be calculated. In addition the receiver 6 can be synchronized with the phase and/or frequency of the carrier sequence during the first and/or second synchronizing stage or after the second synchronizing stage.

The terminal stations 3 and the base station 2 contain a protocol unit for controlling transmission and reception, which protocol unit functions according to the ATM/MAC protocol. In addition the terminal stations 3 and the base station 2 include a modem, with which the TDMA bursts 11 can be received and transmitted. In addition intermediate frequency and high frequency parts known in the art are contained in the transmitters or receivers of the base station 2 and the terminal stations 3. The channel access control unit (MAC) controls access of individual transmitters or receivers to the divided TDMA channel. In addition this MAC controller manages the access requests to the transmission channel as well as the available channel reserves.

For the transmission direction from the terminal stations 3 to the base station 2 (uplink) the MAC control unit requires transmission reserves for signalling supervision (signalling overhead). For data communication each terminal station 3 and the base station 2 is connected to an ATM interface. The aforementioned modem by which ATM cells and signalling data can be received and sent follows this ATM interface. For this purpose dynamic slot allocation (DSA) is provided for the MAC protocol.

Figure 2C:
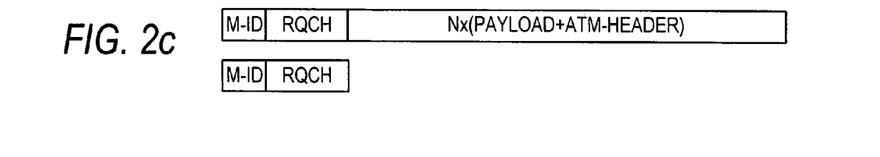
FIG. 2c shows different packet structures for the transmission direction from a terminal station to the base station, FIG. 3 as a block diagram shows a transmission chain from a terminal station to the base station.

In order to coordinate channel access for the uplink, the time slots provided for this are divided into signalling periods. DSA MAC protocol is used for this grouping or division. A signalling period is introduced by a period control PDU in the transmission direction from the base station 2 to the terminal stations 3. This transmission direction is also known as downlink. The period control PDU signals the number of time slots in the next signalling period and the MAC connection which has been allocated. A signalling period can contain a variable number of very short slots, in particular for the request channel (RQCH). Basically the data packet structures shown in FIGS. 2*b* and 2*c* should be considered for the MAC control unit. The signal packet structures for the downlink are shown in FIG. 2*b*. FIG. 2*c* shows the packet structures for the uplink. It is evident that for the downlink only one signal packet length, for example 53 bytes, is provided. For the uplink however at least two packet types are provided. The first, shown in FIG. 2*c* at the top, can comprise a variable length and contain one MAC identification byte (M-Id) and four request channel (RQCH) bytes. In addition a number n×53 of ATM cell bytes is provided. Altogether n×is 53+5 bytes are therefore transmitted.

The second type of packet structure is shown in FIG. 2*c* at the bottom. This data packet only comprises five bytes, whereby one byte for MAC identification (MAC-Id) and four bytes for the request channel are provided. This type of packet is normally used for random access or polling mode.

Figure 11:
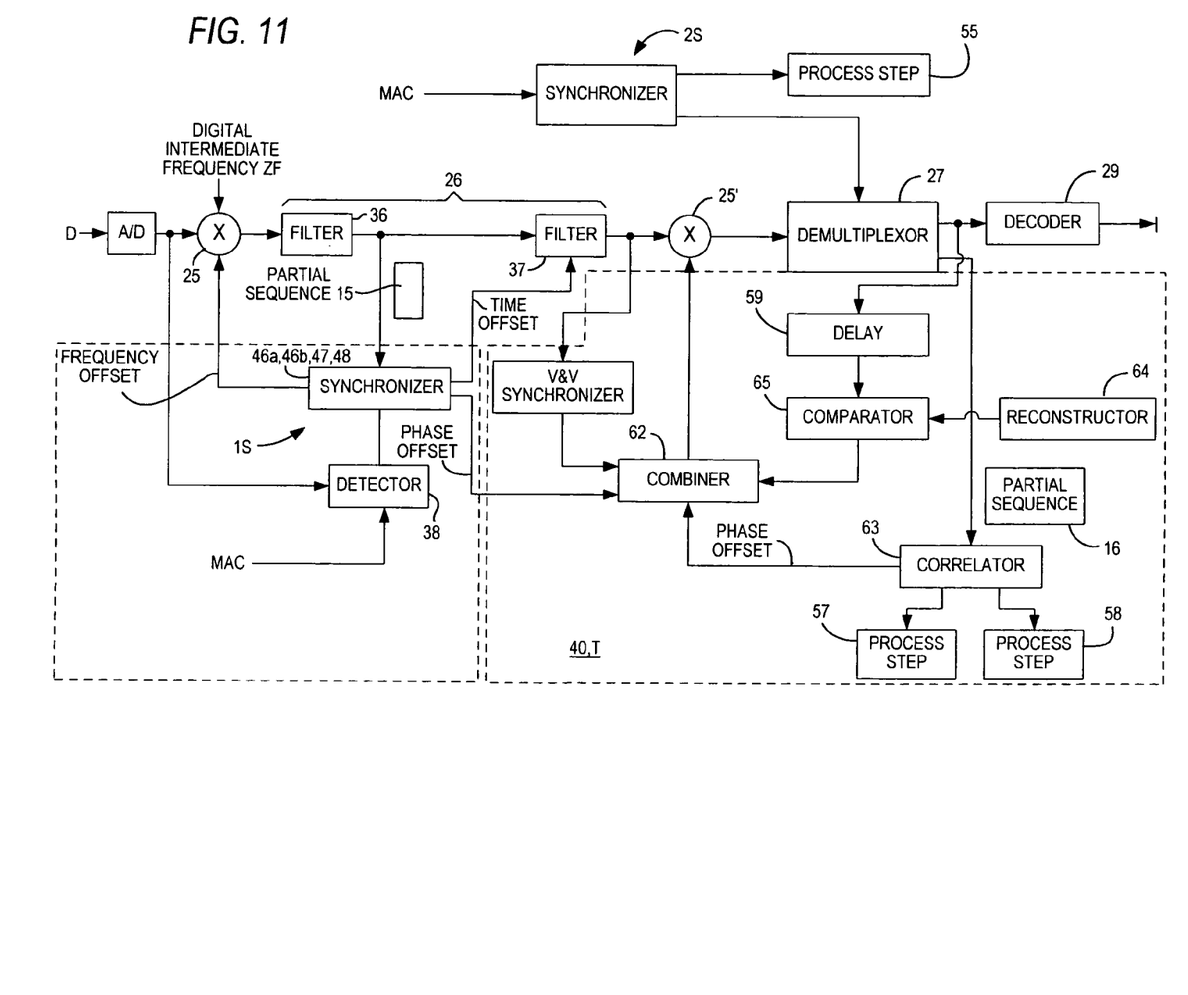
FIG. 11 shows the burst synchronization of a receiver in a summary overview.

It is therefore clear that the packet structures shown in FIG. 2*c* can be transmitted within the useful data packet 12 in FIG. 2*a*. That is to say the packets shown in FIG. 2*c* can be transmitted within the burst 11. Of course it would also be conceivable if the packet structures shown in FIG. 2*b* were likewise transmitted in the burst 11 shown in FIG. 2*a*. That is to say stepwiselsynchronization of the receiver can be provided both for the uplink as well as for the downlink. For further observation however only stepwise synchronization of the receiver is described purely as an example on the basis of FIGS. 3 to 11 in the case of the uplink, FIG. 11 showing a summary overview of the components illustrated separately in FIGS. 3 to 10.

Figure 3:
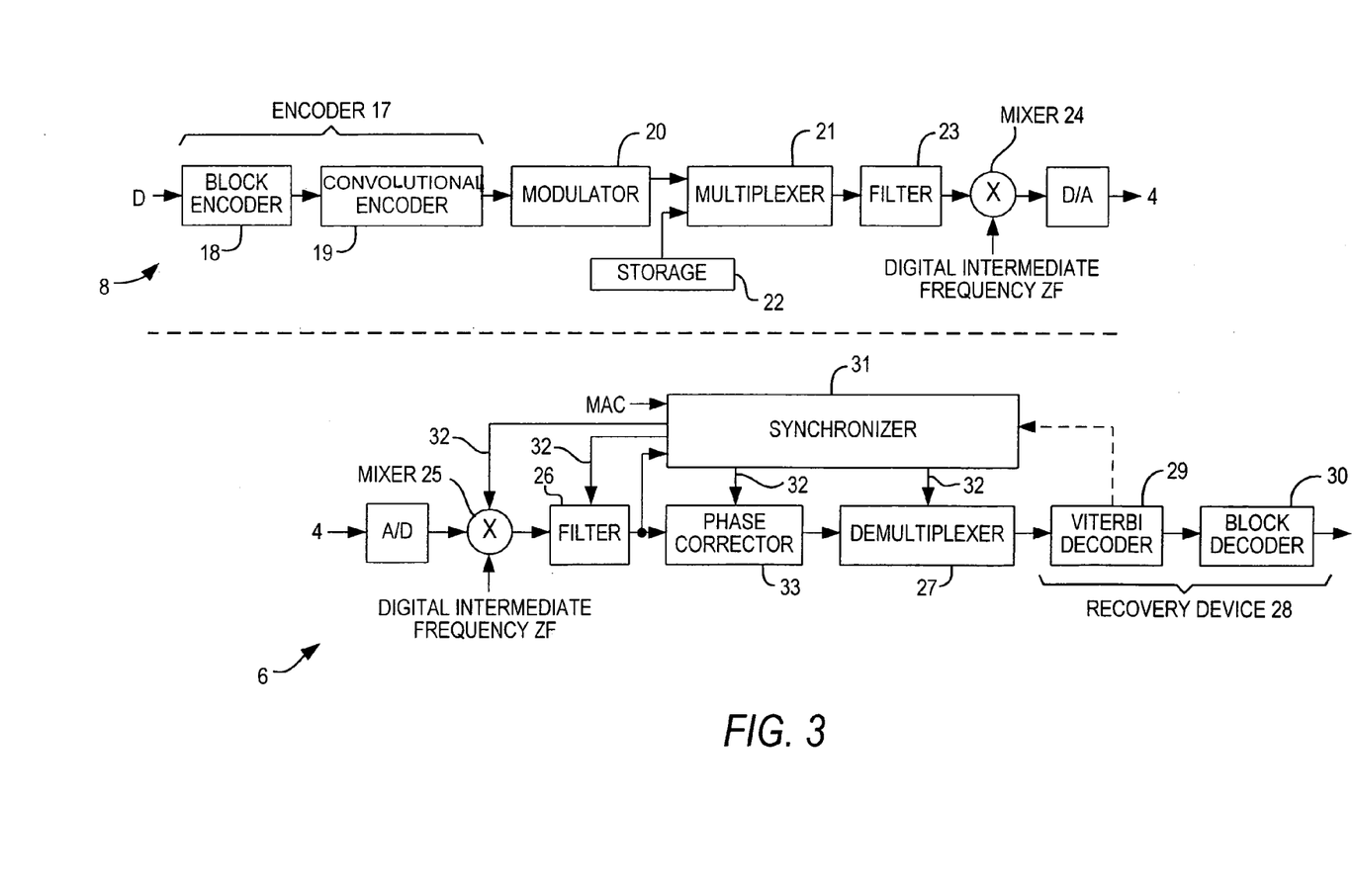

According to FIG. 3 the transmitter 8 of a terminal station 3 comprises several sub-assemblies, which are shown as a block diagram. Digital information D is fed to an encoder 17, which is then encoded in the encoder 17. For this purpose the encoder can include a block encoder 18, in which the digital information D is encoded with an (external) block code, which serves to correct/recognize errors. In addition the encoder 17 can also comprise a convolutional encoder 19, in which the digital information D can be provided with an (internal) code to correct errors. Connected after the encoder 17 is a modulation unit 20, which is also known as a symbol mapper, in which the coded digital information is modulated according to modulation defaults. Here various modulation methods are possible: for example QPSK modulation can be used; obviously other types of modulation are also conceivable up to 16 APSK modulation. A device 21 is connected after the modulation unit 20, which defines or produces the frame structure of a burst 11. That is to say the training sequence 13 as well as the start and end bits are added to the modulated digital information, i.e. the useful data packet 12. In addition a multiplexer is provided in the device 21, which allocates the ready to go bursts 11 to the correct time slot. One or more training sequences 13 are stored in a storage device 22 for adding the training sequence to a useful data packet 12. Preferably such training sequences are used, the symbol sequence of which cannot be formed by a useful data packet, so that useful data packet and training sequence cannot be confused. A transmission filter 23 is connected after the device 21, which is followed by a digital mixer 24, in which a burst 11 is tuned to a digital intermediate frequency ZF. The digital mixer 24 is followed by a digital-analogue converter, from which the now analogue-type signals are transmitted from the base station 2 via the air interface 4 to the receiver 6.

The receiver 6 on the input side comprises an analogue-digital converter, which is followed by a digital mixer 25, which mixes the now digital-type signals with a digital intermediate frequency ZF. In order to be able to evaluate the message arriving at the receiver 6, appropriate demodulation and decoding devices are provided on the receiver side corresponding to the encoding and modulation provided on the transmitter side. In detail these are an input filter 26, which is also known as a matched or signal-adapted filter, which can be configured as a square-root Nyquist filter. Also a demultiplexer 27 is provided on the receiver side. To recover the original information a recovery device 28 is provided, which includes a Viterbi decoder 29 and a block code decoder 30.

After the analogue-digital converter the digital message is down-mixed to the digital intermediate frequency ZF by means of the diaital mixer 25. In order now to be able to carry out demodulation or decoding, a synchronization device 31 is provided which synchronizes the entire receiver 6 with the incoming message. For this purpose after the input filter 26 the training sequence is received by the synchronization device 31, in order to determine at least the clock frequency, the carrier frequency and/or the carrier phase, so that the components on the receiver side can be synchronized via synchronizing control lines 32. A frequency phase correction device 33 is provided between the input filter 26 and the demultiplexer 27 for frequency and/or phase correction. By means of the Viterbi decoder 29 tracking can still be carried out after synchronization, in the case of which phase and/or frequency synchronization can be achieved. The parameters for tracking defined by the Viterbi decoder 29 can be transmitted to the synchronizing unit 31 which therefore can be used for post synchronization of the modules on the receiver side.

Figure 4:
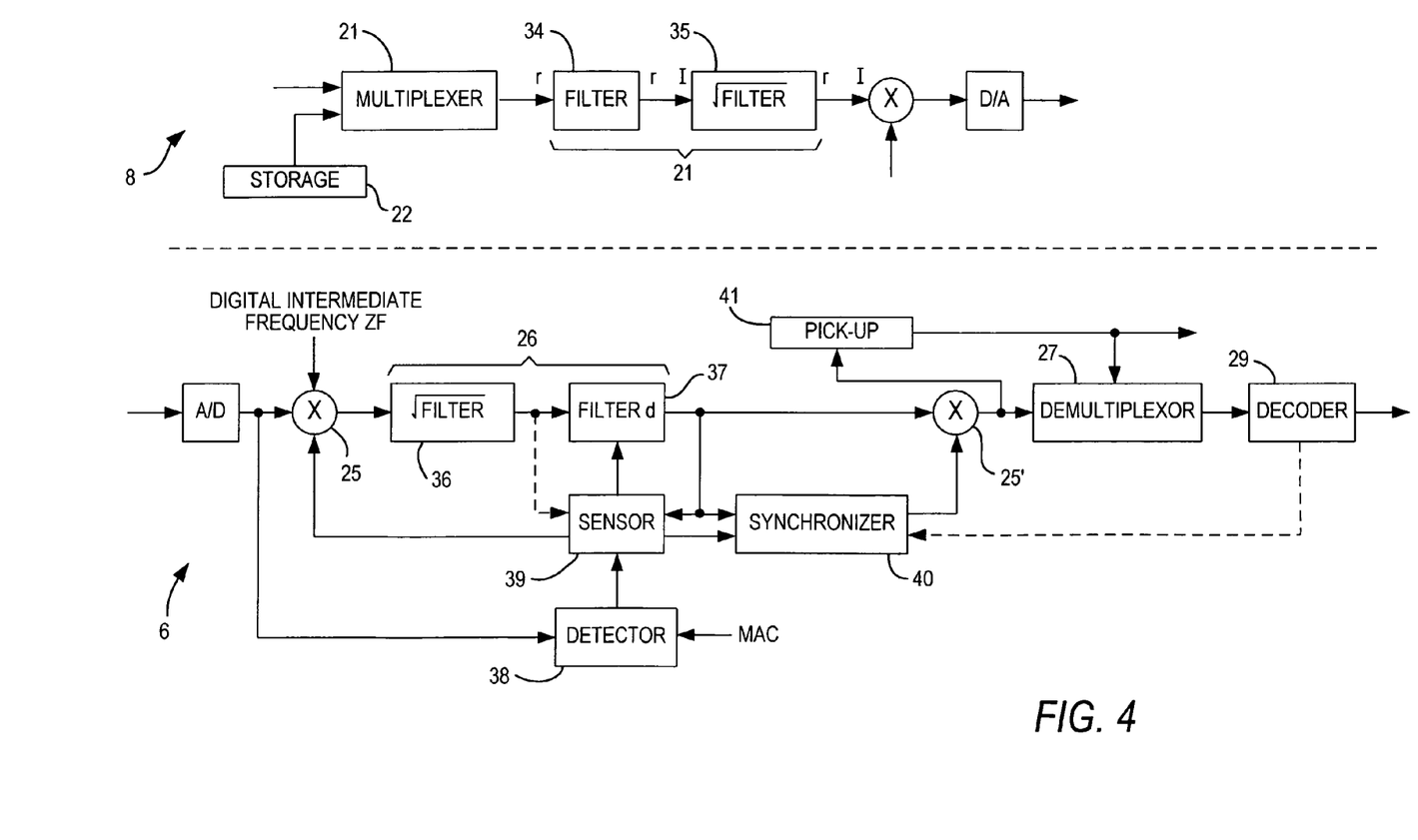
FIG. 4 shows a block diagram with the synchronization of a burst.

The transmitter 8 is partly shown in FIG. 4. Similar or equivalent parts as in the preceding figures are provided with identical reference symbols. The transmitter-side device with the multiplexer 21 here includes an interpolation filter 34, which is followed by a Nyquist filter with a roll off for example of r=0.3. The Nyquist filter is provided in FIG. 4 with the reference symbol 35. This filter 35 serves to shape the pulse. The interpolation filter 34 has an interpolation factor I.

The receiver 6 shown in detail in FIG. 4 comprises the analogue/digital converter and the digital mixer 25, to which the digital intermediate frequency ZF is fed. The input filter 26, which can include a Nyquist filter 36 and a decimation filter 37, that has a decimation factor d, is also shown. The synchronization device 31 here comprises in detail a power or energy detector 38, which detects an incoming burst at the receiver 6. Information from the MAC protocol is fed to this detector 38. A sensor device for the carrier frequency, clock frequency or phase position of the carrier frequency is also arranged in the synchronization device 31, which is provided in FIG. 4 with the reference symbol 39. The sensor device 39 determines the appropriate synchronization parameters from the signal sampled after the filter 36 and sends control pulses to the digital mixer 25 and a device 40 for synchronizing phase or frequency. In addition the signal present after the decimation filter 37 is fed to the sensor device 39 and the synchronization device 40. To produce synchronization the device 40 receives information from the Viterbi decoder 29. A phase/frequency correction unit or complex multiplier 25' is arranged between the decimation filter 37 and the demultiplexer 27, in order to produce phase or frequency synchronization. A pick-up for a device 41 is provided between the decimation filter 37 and the demultiplexer 27, which carries out channel impulse response and time slot synchronization and sends corresponding information to the demultiplexer 27. In addition information is made available for time slot adjustment and gain control (AGC) from the device 41.

Figure 5:
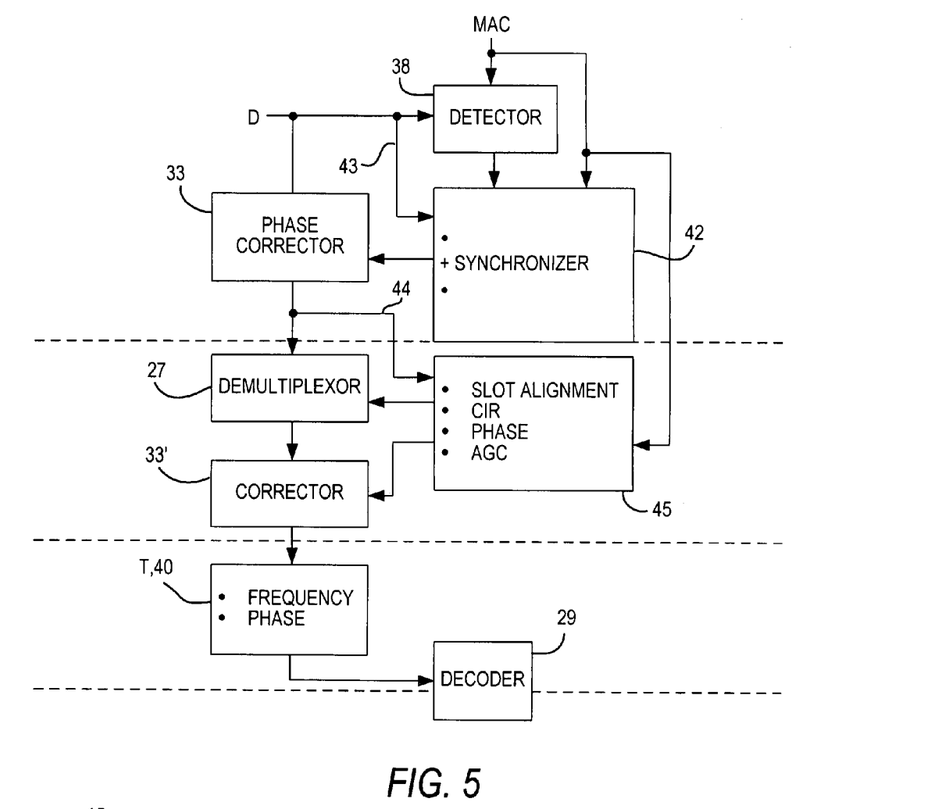
FIG. 5 shows a flow chart of a burst synchronization.

FIG. 5 shows a block diagram for step wise synchronization of the receiver 6. The received signal D is detected by the power detector 38. Clock and frequency or phase position of the carrier frequency are roughly synchronized during the first synchronizing stage 42. For this purpose the first partial sequence 15 is evaluated from the received signal D, which is shown by an arrow 43. The demultiplexer 27 is synchronized for phase or frequency and clock by means of the correcting device 33.

The second partial sequence 16 is evaluated during the second synchronizing stage 45. Transmission of the second training sequence is marked by the diagram arrow 44. Time slot adjustment and channel impulse response (CIR) are evaluated during the second synchronizing stage 45. The receiver is then synchronized for slot adjustment and channel impulse response by means of a second correcting device 33'.

Tracking T can follow the second synchronizing stage, in which the receiver is synchronized for frequency and/or phase. The synchronized received signal is then transmitted to the Viterbi decoder 29.

Therefore the parameters necessary for synchronizing the receiver are determined in the final stages 42 and 45. Either the clock or frequency or the clock and the,phase of the received burst are determined during stage 42, whereby the first training sequence is used for this purpose. The parameters necessary for time slot adjustment and channel impulse response are determined in stage 45. In addition the phase can again be determined during the second synchronizing stage 45 in particular if the clock and frequency have been determined during the first synchronizing stage. In addition the previously mentioned AGC can also be determined.

Figure 6:
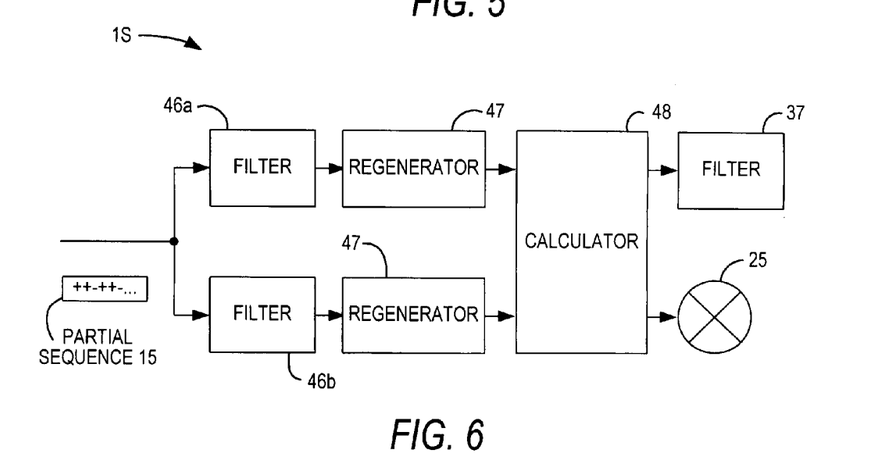
FIG. 6 shows a block diagram with the first synchronization stage according to a first embodiment.

According to FIG. 6 the first partial sequence 15, which is shown here purely as an example by pilot signals (++--++-- . . . ) is evaluated in such a way that the first partial sequence 15 received is fed to two low-pass filters 46a and 46b, whereby each filter 46a and 46b is followed by a linear regeneration unit 47. Clock and frequency offset are then determined in a calculation unit 48, so that the parameters obtained can be transmitted to the components following the calculation unit 48. The first partial sequence 15 in this case is formed by pilot signals. The previously mentioned parameters are determined from these pilot signals. This method is very similar to the known pilot signal technology, in which all functional sequences are carried out in the time domain. Since the first partial sequence 15 includes these pilot signals + and –, the incoming signal corresponds to a signal with essentially cosine form, so that the Fourier transform of this signal results in two pilot signals, which contain frequency offset and clock information. After the signal has been filtered by the two differently constructed filter elements 46a and 46b and as a result of the execution of linear regeneration in the units 47 clock and frequency offset can be deduced. In this embodiment of the first synchronizing stage 1S according to FIG. 6 phase offset is preferably calculated during the second synchronizing stage 2S by means of the second partial sequence 16.

Figure 7:
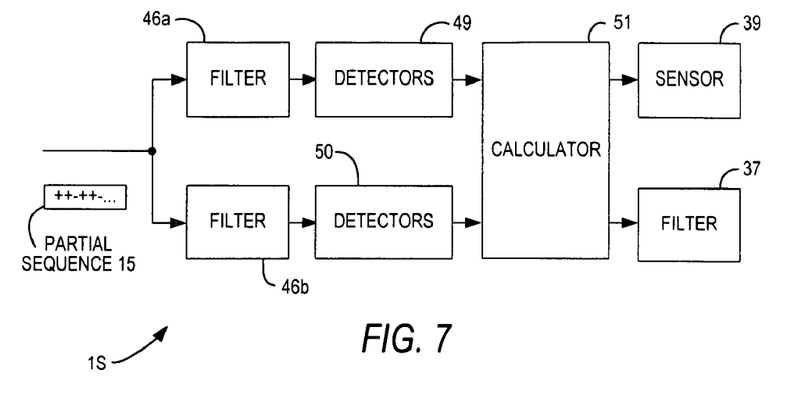
FIG. 7 shows a block diagram of the first synchronization stage according to a second embodiment.

In the block diagram according to FIG. 7 firstly the phase offset and clock are determined during the first synchronizing stage (alternative to the embodiment shown in FIG. 6). For this purpose the first partial sequence 15 is again fed to two filters 46a and 46b, whereby the filter 46a is followed by a phase detector 49 and the filter 46b is followed by a time detector 50. Phase offset and clock are then determined by a mean value calculator 51 and passed onto the devices downstream. If preference is given to this variant, frequency offset is preferably calculated during the second synchronizing stage and the receiver synchronized with it.

Figure 8:
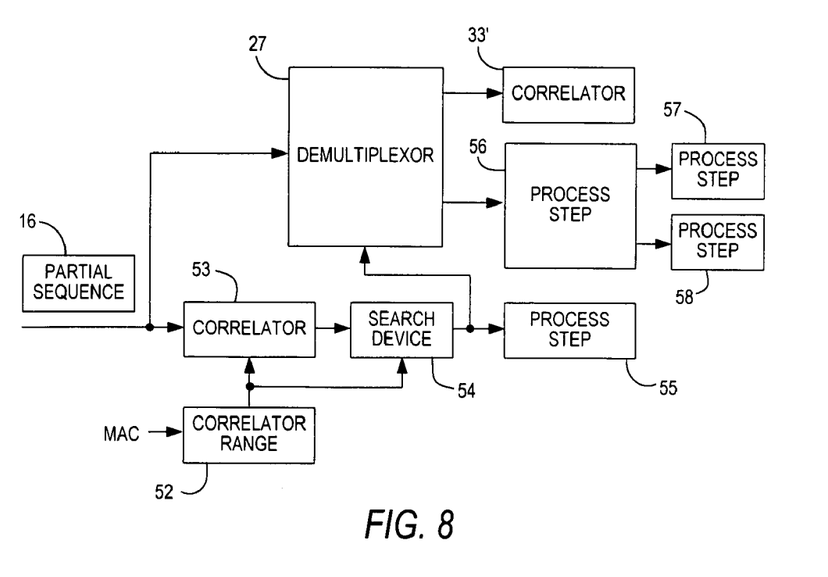
FIG. 8 shows a block diagram with the second synchronization stage.

The already pre-synchronized signal is further processed—in accordance with FIG. 8—for execution of the second synchronizing stage 2S. The second partial sequence 16 is used for time slot synchronization (slot alignment), based on a correlation process. For a fundamental search or monitoring function, in order to be able to detect all the symbols in the time slot, the time slot must be evaluated symbol by symbol. Reduced symbol intervals in this case are considered by the fact that it is known through the MAC protocol whether a time slot with useful data is concerned or only a burst with channel request information, whereby the MAC-Id (FIG. 2c) can be evaluated for this purpose. Within a correlation range 52 the useful data received is correlated with the second partial sequence in a device 53. A parallel or subsequent search for maximum excursion (peak) is carried out in a device 54, in order to be able to produce time slot synchronization in a process step 55. Next the time slot received and the second partial sequence 16 are again correlated with one another, whereby cross correlation is preferably used here, as a result of which this takes place through symbols of the first training sequence being shifted by a number P in a process step 56. As a result the channel impulse response or gain control factor (AGC) can be determined in process steps 57 and 58.

Figure 9:
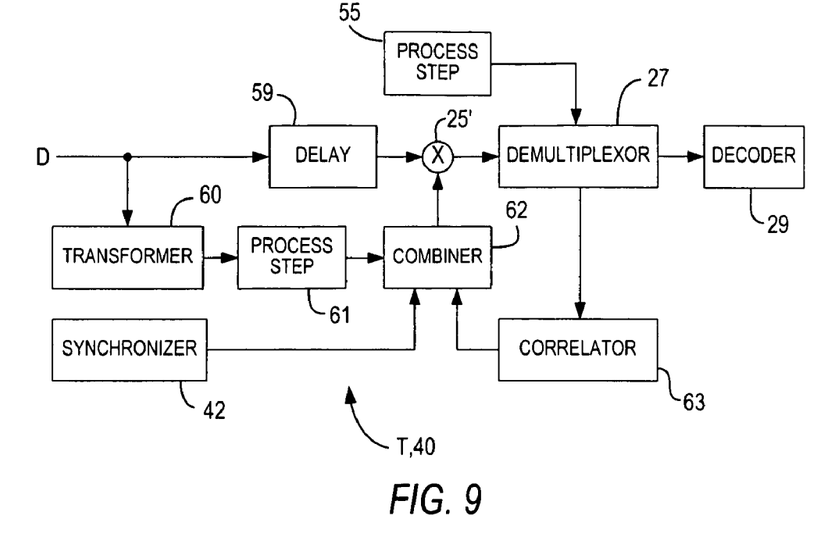
FIG. 9 shows a block diagram with tracking according to a first embodiment.

Frequency/phase synchronization is described below on the basis of FIG. 9. The incoming signal is delayed in process step 59 by a number of samples. Parallel with this non-linear transformation of the incoming signal takes place in a process step 60. The mean value is determined for the entire amount of the samples in a process step 61. The calculated phase parameters and the static phase are combined in a combination step 62, whereby the static phase has been determined by correlation from the training sequence in a process step 63. The combined values are then used for the synchronization position via the complex multiplier 25'. In FIG. 9 similar or equivalent parts are provided as in the remaining figures with identical reference symbols.

Frequency and/or phase synchronization is therefore necessary in many cases since there could be influences from the known jitter and Doppler effects or similar, as a result of which the phase position can change over the length of a time slot, in particular in the case of a useful data time slot, so that only one-off correction to the appropriate phase position with a one-off calculated value is not sufficient in all cases. The bit error rate can therefore be reduced during phase and/or frequency synchronization. In addition an improvement can be achieved, if a combination of the first and second partial sequences is considered in such a way that one of the partial sequences includes the pilot signals, and symbols which provide good correlation results are contained in the second partial sequence. A Viterbi & Viterbi algorithm which is processed in a V & V device (FIG. 11) can be used for phase and/or frequency synchronization. The parameters provided by this V & V device are then consulted for tracking.

An alternative to the method described in FIG. 9 is clear from the fact that an equivalent input signal D' (FIG. 10) is reconstructed by means of the Viterbi decoder 29, whereby a phase comparison between the received signal and the reconstructed (rebuilt) signal is subsequently carried out. For this purpose an initial value is preferably used, that is to say one which has been calculated during the first synchronizing stage 1S as phase offset. If the phase offset has been determined during the second synchronizing stage, this value can obviously also be used as initial value. This method is shown as a flow chart in FIG. 10. Similar or equivalent parts as in the remaining figures are provided with the same reference symbols.

Figure 10:
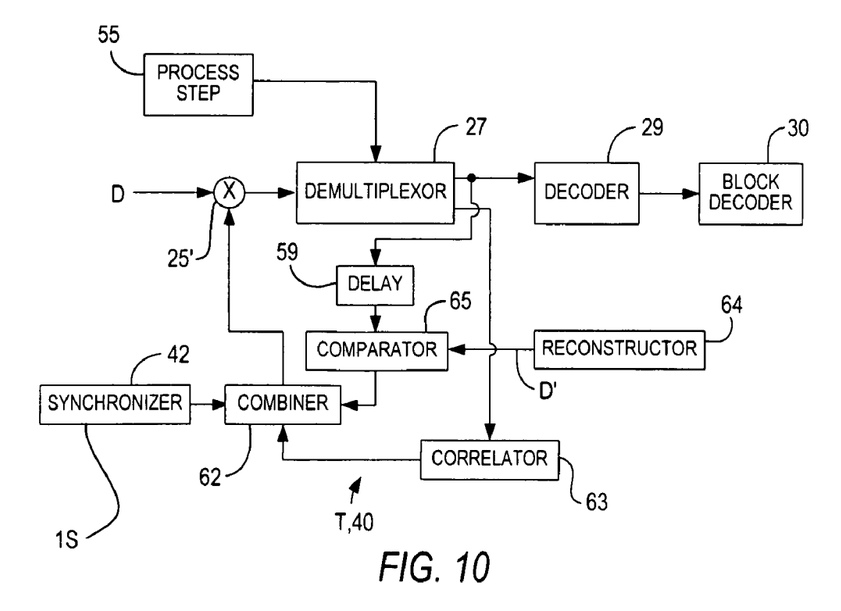
FIG. 10 shows a block diagram with the second synchronization stage according to a second embodiment.

A signal reconstructing device 64 and phase comparator 65 are provided in order to compare the signal acquired after the demultiplexer 27 with the signal reconstructed from the device 64, in order to calculate the various phase position offsets during tracking. The receiver can then be synchronized accordingly with the combination device 62.

The invention claimed is:

1. A method of operating a message receiver for a message that is present as a burst allocated to a time slot which includes at least a training sequence and useful data, said training sequence including at least a first partial sequence and a second partial sequence, and said first partial sequence comprising periodic data, said method comprising stepwise synchronizing said receiver to said burst as said burst is received by performing the steps of:
   in a first synchronizing stage, using said first partial sequence to determine a clock frequency of said message and at least one of a phase position of a carrier frequency of said burst and the carrier frequency of said burst, and
   in a second synchronizing stage, using said second partial sequence to synchronize said receiver to said time slot of said burst, said second synchronizing stage occurring after said first synchronizing stage.

2. The method according to claim 1, and calculating a channel impulse response and a gain control factor (AGC) during the second synchronizing stage.

3. The method according to claim 1, wherein the receiver is synchronized during the second synchronizing stage with the carrier frequency of the burst.

4. The method according to claim 1, wherein the receiver is synchronized during the second synchronizing stage with a phase position of the carrier frequency.

5. The method according to claim 1, wherein the receiver is synchronized with a phase and a frequency of a carrier frequency tracking after the first synchronizing stage or during or after the second synchronizing stage.

6. The method according to claim 5, wherein the tracking takes place when the message is decoded.

7. The method according to claim 5, wherein the tracking and decoding take place by means of a Viterbi decoder and according to Viterbi & Viterbi algorithms.

8. The method according to claim 1, wherein at least one of the two partial sequences includes a symbol sequence, which enables alignment of the time slot of the burst and calculation of channel impulse response, the phase position, gain control factor (AGC) as well as transmission power.

9. The method according to claim 1, wherein one of the two partial sequences includes pilot signals.

10. The method according to claim 1, wherein at least one of the two partial sequences includes at least pseudo noise sequences.

11. The method according to claim 1, wherein the useful data of the message is statistically evaluated for the second synchronizing stage.

12. The method according to claim 1, wherein the training sequence comprises a constant duration or number of symbols.

13. The method according to claim 1, and detecting an incoming burst in the receiver by means of power detection.

14. The method according to claim 1, wherein the time slot has a structure which is determined when the burst arrives.

15. The method according to claim 1, and calculating a channel impulse response by cross correlation of the burst and the second partial sequence.

16. The method according to claim 15, wherein, during the cross correlation, the training sequence is shifted by a pre-definable number of symbols, in order to determine a corresponding number of multipath propagation echoes.

17. The method according to claim 16, wherein the phase position and amplitude of each multipath propagation is determined from the echoes.

18. The method according to claim 17, and determining the gain control factor from the phase position and the amplitude.

19. The method according to claim 17, and determining a constant phase position for each of the multipath propagation.

20. The method according to claim 1, and evaluating a periodic partial sequence in time domain.

21. The method according to claim 20, and evaluating the second partial sequence within a complex number range.

22. The method according to claim 1, and adding the training sequence as a preamble to the useful data.

* * * * *

UNITED STATES PATENT AND TRADEMARK OFFICE
CERTIFICATE OF CORRECTION

PATENT NO. : 7,346,138 B2  Page 1 of 1
APPLICATION NO. : 10/344773
DATED : March 18, 2008
INVENTOR(S) : Fazel et al.

It is certified that error appears in the above-identified patent and that said Letters Patent is hereby corrected as shown below:

On the Title Page, in Field (75), under "Inventors", in Column 1, Line 3, delete "Backnang" and insert -- Berlin --, therefor.

On the Title Page, in Field (30), under "Foreign Application Priority Data", in Column 1, Line 1, delete "100 40 222" and insert -- P10040222.4 --, therefor.

In Column 7, Line 5, delete "phase." and insert -- phase --, therefor.

In Column 7, Line 11, delete "stage.," and insert -- stage, --, therefor.

In Column 7, Line 12, delete "synchronization" before "or the".

In Column 8, Line 4, delete "n×is" and insert -- n × is --, therefor.

In Column 8, Line 17, delete "stepwiselsynchronization" and insert -- stepwise synchronization --, therefor.

In Column 9, Line 7, delete "diaital" and insert -- digital --, therefor.

In Column 9, Line 63, delete "step wise" and insert -- stepwise --, therefor.

In Column 10, Line 19, delete "the,phase" and insert -- the phase --, therefor.

Signed and Sealed this

Tenth Day of February, 2009

JOHN DOLL
*Acting Director of the United States Patent and Trademark Office*